(12) United States Patent
Goujon

(10) Patent No.: US 9,709,688 B2
(45) Date of Patent: *Jul. 18, 2017

(54) DEGHOSTING USING MEASUREMENT DATA FROM SEISMIC SENSORS

(71) Applicant: WesternGeco L.L.C., Houston, TX (US)

(72) Inventor: Nicolas Goujon, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/663,451

(22) Filed: Mar. 19, 2015

(65) Prior Publication Data

US 2015/0192687 A1 Jul. 9, 2015

Related U.S. Application Data

(63) Continuation of application No. 13/151,236, filed on Jun. 1, 2011, now Pat. No. 9,019,797.

(60) Provisional application No. 61/353,305, filed on Jun. 10, 2010.

(51) Int. Cl.
*G01V 1/36* (2006.01)
*G01V 1/18* (2006.01)
*G01V 1/38* (2006.01)

(52) U.S. Cl.
CPC .............. *G01V 1/364* (2013.01); *G01V 1/186* (2013.01); *G01V 1/38* (2013.01); *G01V 2210/56* (2013.01)

(58) Field of Classification Search
CPC .......... G01V 1/364; G01V 1/186; G01V 1/38; G01V 2210/56
USPC .......................................................... 367/24
See application file for complete search history.

(56) References Cited

U.S. PATENT DOCUMENTS 9,019,797 B2 * 4/2015 Goujon ................. G01V 1/364
181/110
2011/0305108 A1 12/2011 Goujon

* cited by examiner

*Primary Examiner* — Daniel L Murphy

(57) ABSTRACT

Measurement data is received from first and second seismic sensors, where the first and second seismic sensors are oriented in opposite directions. Each of the first and second seismic sensors has a sensing element responsive to pressure and particle motion. The signals can be combined to remove the particle motion component of the measurement data and obtain pressure-only data. Alternatively, the signals can be combined to deghost the received measurement data.

13 Claims, 4 Drawing Sheets

DEGHOSTING USING MEASUREMENT DATA FROM SEISMIC SENSORS

CROSS REFERENCE TO RELATED APPLICATIONS

This is a continuation application of co-pending U.S. patent application Ser. No. 13/151236, to Nicolas Goujon, filed on Jun. 1, 2011, and entitled "DEGHOSTING USING MEASUREMENT DATA FROM SEISMIC SENSORS" which claims the benefit under 35 U.S.C. §119(e) of U.S. Provisional Application Ser. No. 61/353,305 entitled "PRESSURE, PRESSURE GRADIENT AND ACCELERATION SENSORS AND COMBINATIONS THEREOF," filed Jun. 10, 2010, and is hereby incorporated by reference.

BACKGROUND

Survey data can be collected and processed to produce a representation (e.g. image) of a subterranean structure. In some implementations, survey data includes seismic survey data collected using seismic survey equipment. The seismic survey equipment includes one or more seismic sources that are activated to produce seismic waves propagated into the subterranean structure. A part of the seismic waves is reflected from the subterranean structure and detected by seismic sensors that are part of the survey equipment.

Seismic surveying can be performed in a marine environment. An issue associated with marine seismic surveying is the presence of ghost signals. Ghost signals refer to signals in measurement data resulting from reflections from an air-water interface of the marine environment. A seismic wave generated by a seismic source is propagated generally downwardly into the subterranean structure. A reflected seismic wave (that is in response to the seismic wave propagated by the seismic source) propagates generally upwardly toward an arrangement of seismic sensors. In the marine environment, the seismic wave reflected from the subterranean structure continues to propagate towards the air-water interface, where the seismic wave is reflected back downwardly.

This reflected, generally downwardly traveling seismic wave is detected by the seismic sensors as ghost signals appearing in measurement data collected by the seismic sensors. The presence of ghost signals can result in reduced accuracy when generating a representation of the subterranean structure based on the measurement data.

SUMMARY

In general, according to some embodiments, measurement data is received from first and second seismic sensors, where the first and second seismic sensors are oriented in opposite directions. Each of the first and second seismic sensors has a sensing element responsive to pressure and particle motion. Signals of the seismic sensors can be combined to remove the particle motion component of the measurement data and obtain pressure-only data. Alternatively, the signals can be combined to deghost the received measurement data.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
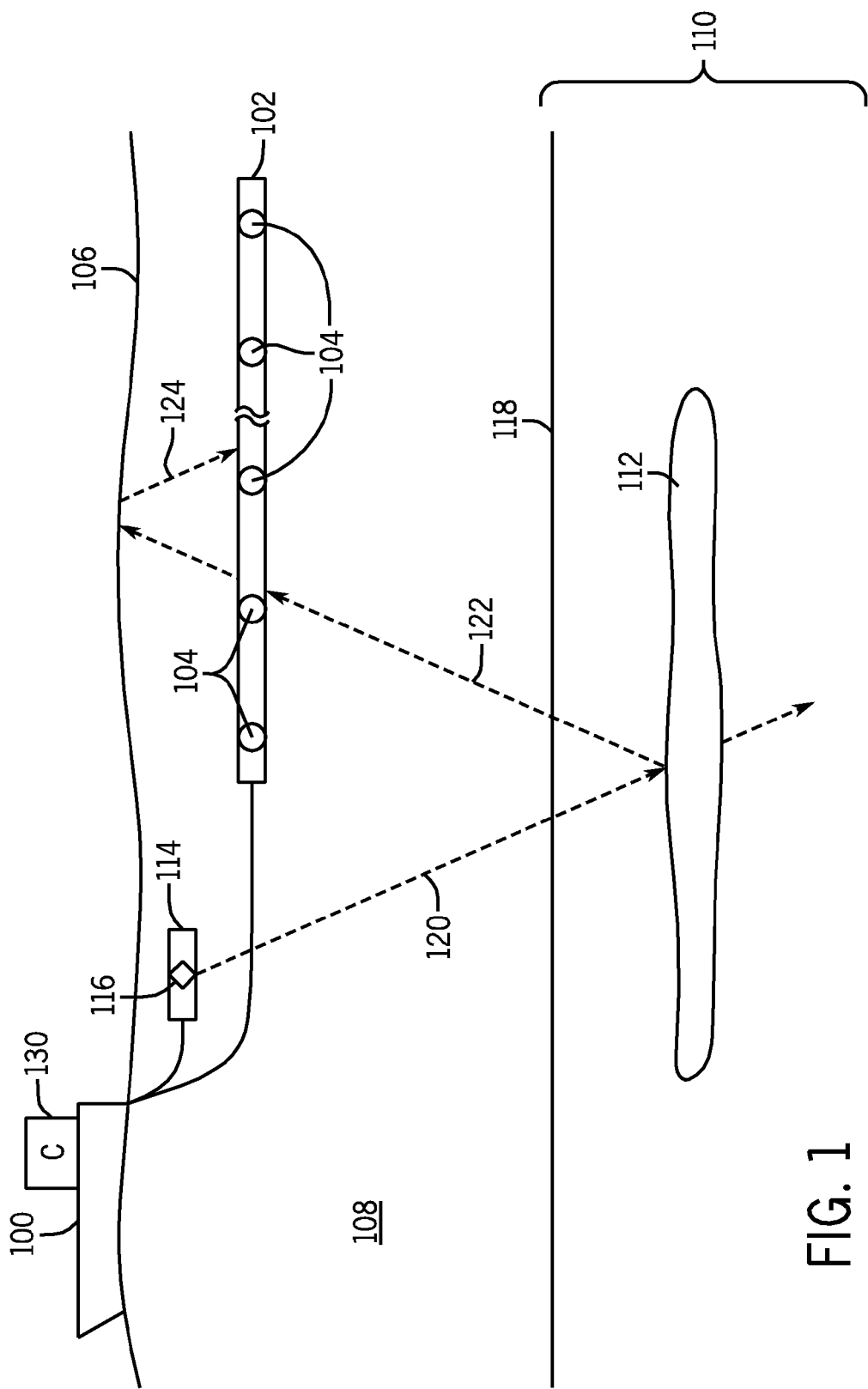
FIG. 1 is a schematic diagram of an example marine survey arrangement for collecting survey data associated with a subterranean structure.

FIG. 1 illustrates an example marine survey arrangement that includes a marine vessel 100 for towing a streamer 102 that includes seismic sensors 104. In addition, the marine vessel 100 (or a different marine vessel) can tow a seismic source assembly 114, which has at least one seismic source 116.

The marine vessel 100 tows the streamer 102 and seismic source assembly 114 through a body of water 108 above a bottom surface 118 (e.g., seafloor). A subterranean structure 110 is located below the bottom surface 118, and the subterranean structure 110 includes at least one subterranean element 112 of interest. Examples of the subterranean element 112 can include a hydrocarbon-bearing reservoir, a freshwater aquifer, a gas injection zone, or other subterranean element of interest.

FIG. 1 further depicts an arrow 120 that represents a seismic wave generated by the seismic source 116 and propagated generally downwardly into the subterranean structure 110. A portion of the seismic wave 120 is reflected from the subterranean structure 110, and propagates generally upwardly (as indicated by arrow 122) toward the streamer 102. The upwardly-propagated seismic wave (122) is detected by the seismic sensors 104 of the streamer 102.

The upwardly-propagating seismic wave (122) continues to propagate upwardly until the wave reaches the air-water interface (106), where the seismic wave is reflected generally downwardly (as indicated by arrow 124). The reflected downwardly-propagating seismic wave (124) is also detected at the seismic sensors 104, which leads to ghost signals appearing in the measurement data collected by the seismic sensors 104.

FIG. 1 further depicts a controller 130 deployed at the marine vessel 100. The controller 130 can be used to control activation of the seismic source 116. The controller 130 can also receive measurement data collected by the seismic sensors 104. In some examples, the controller 130 is able to process the collected measurement data, such as to develop an image or other representation of the subterranean structure 110. In alternative examples, the collected measurement data from the seismic sensors 104 can be communicated to a remote system for further processing.

In accordance with some embodiments, the seismic sensors 104 are arranged to allow for efficient deghosting of measurement data.

Figure 2:
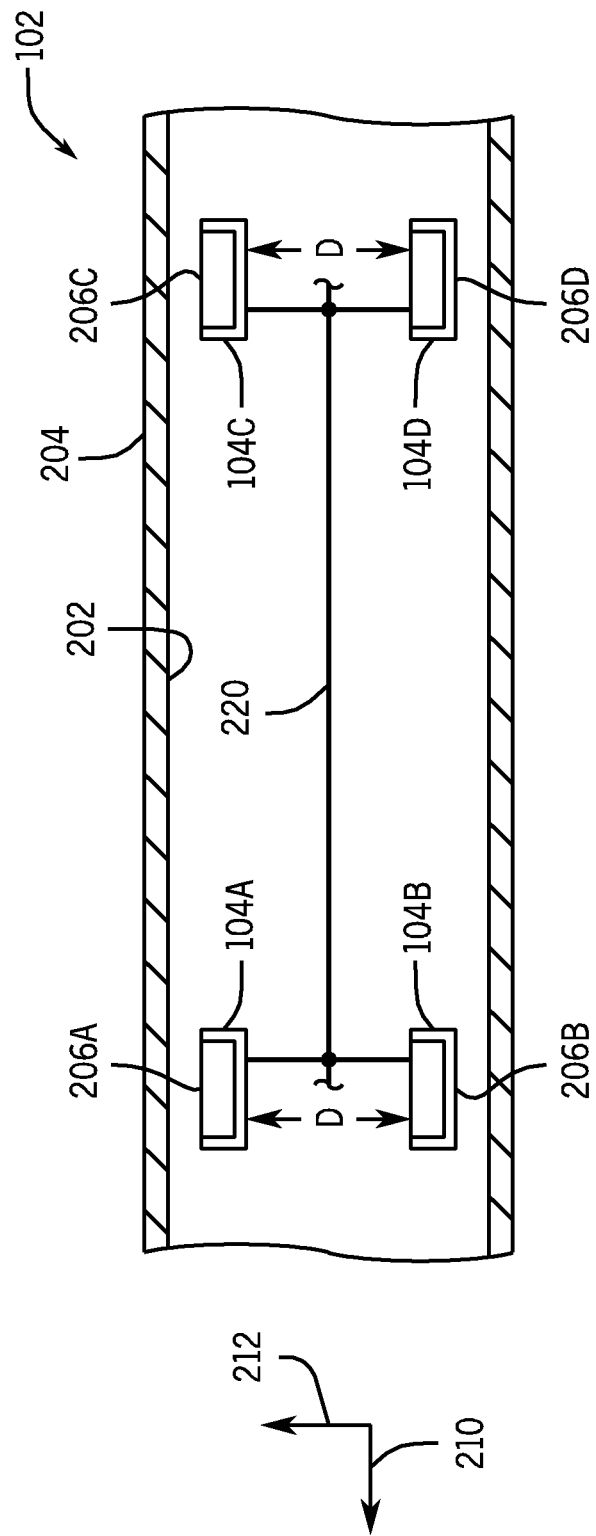
FIG. 2 is a longitudinal sectional view of a portion of a streamer that includes seismic sensors according to some implementations.

FIG. 2 is a longitudinal sectional view of a portion of the streamer 102 that has an outer housing 204. In the example of FIG. 2, four seismic sensors 104A, 104B, 104C, and 104D are shown. The seismic sensors 104A-104D are connected to a communication medium 220 (e.g. electrical cable or optical fiber). The communication medium 220 communicates measurement data of the seismic sensors to a remote system, such as the controller 130 of FIG. 1.

In some implementations, each of the seismic sensors 104A-104D includes a sensing element 206A, 206B, 206C, or 206D. The sensing elements 206A, 206B, 206C, and 206D of the corresponding seismic sensors 104A, 104B, 104C, and 104D.are exposed to the outside pressure (outside the housing 204). However, the inside of each of the seismic sensors 104A-104D is not exposed to outside pressure. Each sensing element 206A-206D produces a voltage due to the pressure difference between the inside and outside of the seismic sensor, where this pressure difference causes a strain on the sensing element.

In some implementations, the sensing element is formed of a piezoelectric material—such as sensing element is referred to as a piezoelectric element (or more simply "piezo element"). A piezoelectric element or piezo element refers to an element formed of a material that exhibits a piezoelectric effect, in which electrical charge accumulates in the material in the presence of mechanical strain (such as due to pressure, acceleration, etc.). The piezo element can be a piezo ceramic element. In alternative examples, the piezo element 206A, 206B, 206C, or 206D can be formed of a different type of material that exhibits a piezoelectric effect. The piezo element is responsive to both pressure and acceleration.

Piezoelectric hydrophones used in a seismic streamer are designed to measure only the pressure signal and to cancel out the acceleration pick-up (acceleration cancelling hydrophone). There are two typical solutions to achieve this: using two bender plates in one sensor or using a tubular ceramic sensing element.

In accordance with some embodiments, the piezo element 206A, 206B, 206C, or 206D is formed of a single plate (bender) in each respective seismic sensor 104A, 104B, 104C, or 104D. A single-plate design for the piezo element means that the sensor 104A, 104B, 104C, or 104D includes just a single plate formed of a piezoelectric material. Use of a single piezo plate design results in a seismic sensor of smaller size than a seismic sensor that uses two piezo plates (e.g., two piezo ceramic plates that are spaced apart from each other), or that uses tubular ceramics. Dual bender hydrophone and tubular hydrophones are acceleration cancelling.

Alternatively, the sensing element used in each seismic sensor can be based on MEMS (microelectromechanical systems) technology. MEMS technology involves use of very small electro-mechanical devices. A MEMS sensing element, such as a piezo-resistive MEMS element, can also measure both pressure and acceleration.

Alternatively, the sensing element used in each seismic sensor can be based on optical sensing technology. Optical sensors can measure phase shifts in the light propagating in an optical fiber, where the phase shifts are caused by deformation of the optical fiber which can be caused by pressure or particle motion.

In some examples according to FIG. 2, the measurement data collected by the sensor 104A includes (P, −A), where P represents pressure, and A represents acceleration. The negative sign before A (−A) represents negative acceleration. The sensor 104A measures negative acceleration due to its orientation.

The seismic sensor 104B collects the following measurement data: (P+ΔP, A). Note that the acceleration measured by the seismic sensor 104B is positive acceleration, in contrast to the negative acceleration measured by the seismic sensor 104A. The opposite polarities of the acceleration measured by the seismic sensors 104A and 104B are due to the opposite orientations of the seismic sensors 104A and 104B—the seismic sensor 104A is oriented in a first direction, whereas the seismic sensor 104B is oriented in a second, opposite direction. In the arrangement shown in FIG. 2, the sensing element 206A of the seismic sensor 104A faces upwardly, whereas the sensing element 206B of the seismic sensor 104B faces downwardly. ΔP is the difference between the pressures measured by the two sensors in a pair. Because of the distance between the two sensors, a seismic wave passing the streamer will be recorded with a small time shift between the two sensors. As the wavelength of the signal propagating in water at a velocity of about 1500 m/s (meters per second) is long compared to the diameter of the streamer in the frequency range of interest, ΔP is small compared to P.

The seismic sensors 104A and 104B form a pair of seismic sensors that collect respective measurement data that can be processed using techniques according to some embodiments. The seismic sensors 104C and 104D provide another pair of seismic sensors that are oriented in opposite directions.

More generally, if the streamer 102 is considered to have a longitudinal axis 210, then each pair of seismic sensors (e.g., 206A, 206B, or 206C, 206D) is positioned at the same respective axial location along the longitudinal axis 210, but the pair of seismic sensors are spaced apart along a lateral direction (indicated by arrow 212) by a particular distance (represented as D in FIG. 2). Although the pair of seismic sensors 104A, 104B is depicted as being spaced apart by the same distance (D) as the pair of seismic sensors 104C, 104D, in alternative implementations, the pairs of seismic sensors can be spaced apart by different amounts.

Based on the measurement data (P, −A) collected by the seismic sensor 104A and the measurement data (P+ΔP, A) collected by the seismic sensor 104B, a pressure signal and a vector signal can be derived. The pressure signal represents pressure—the pressure measured by the sensors 104A and 104B are not directionally sensitive to the orientations of the sensors. The vector signal represents a directional wave sensed by the sensors, and the vector signal is sensitive to the orientation of each sensor. The vector signal can represent the acceleration or particle motion associated with a seismic wave.

The pressure signal can be derived by adding the measurement data, (P, −A) and (P+ΔP, A), of the seismic sensors 104A and 104B, to result in the following:

$$(P-A)+(P+\Delta P+A)=2P+\Delta P\approx 2P, \text{ because } \Delta P<<P.$$

Note that 2P+ΔP corresponds to the pressure at the center of the streamer (half way between the two sensors 104A and 104B of the pair). Thus, it can be seen that adding the measurement data collected by the pair of seismic sensors 104A and 104B results in a pressure signal. Being able to collect pressure signal only (combining both sensor measurement to remove acceleration) is beneficial, as it allows for the use of simpler and smaller (non-acceleration cancelling) hydrophones—acceleration cancellation is done when combining the measurements of the two sensors in a pair. Note that the combination of measurements can be performed in the digital domain or analog domain. An example of combining the measurements in the analog domain is by electrically connecting outputs of the two sensors of each pair together. For other applications, the measurement combination can be digitally.

Subtracting the measurement data collected by the seismic sensors 104A and 104B results in the following:

$$(P+\Delta P+A)-(P-A)=2A+\Delta P.$$

The foregoing result includes twice the acceleration (2A) and the pressure gradient (ΔP), which represents the difference in pressure detected by the seismic sensors 104A and 104B. Both A and ΔP are measures of the vector signal. This result represents the vector signal measured by the pair of seismic sensors 104A and 104B.

Note that the vector signal produced by subtracting the measurement data of the seismic sensors 104A and 104B is directional, whereas the pressure detected by the seismic sensors 104A and 104B is non-directional (in other words, the pressure detected does not depend on the specific orientation of the seismic sensors).

The same processing (adding and subtracting) can be applied to the measurement data collected by the other pair of seismic sensors 104C, 104D. Further pairs of seismic sensors (not shown) in the streamer 102 can collect measurement data that are processed in similar fashion.

By providing two sensors in a pair that are oriented in opposite directions, the seismic sensors can record separately up-going and down-going seismic waves, to allow for reconstruction of the pressure and vector signals, as discussed above. The ability to reconstruct the pressure and vector signals recorded separately for up-going and down-going seismic waves allows for processing of the pressure and vector signals to provide deghosting, as discussed further below.

In some embodiments, it is possible to connect the seismic sensors together. For example, in FIG. 2, the seismic sensor 104A can be connected to the seismic sensor 104C, while the seismic sensor 104B is connected to the seismic sensor 104D. The combined output from the seismic sensors 104A, 104C and the combined output from the seismic sensors 104B and 104D can be processed in similar fashion as discussed above to produce the respective pressure signal and the vector signal.

Figure 3:
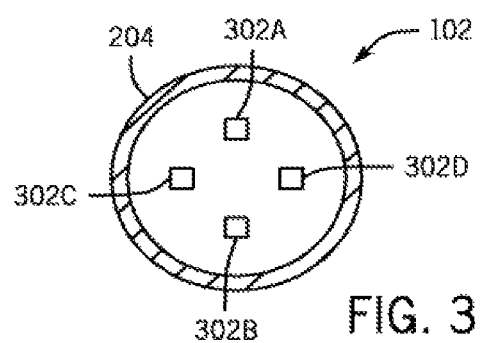
FIG. 3 is a cross-sectional view of a portion of the streamer including an arrangement of seismic sensors according to alternative implementations.

While FIG. 2 depicts just a pair of seismic sensors at each axial location along the longitudinal access 210 of the streamer 102, in alternative implementations, additional seismic sensors can be provided at each axial location of the streamer 102. For example, FIG. 3 is a cross-sectional view of the streamer 102 that shows an arrangement in which four seismic sensors are provided at a particular axial location along the longitudinal axis 210 (FIG. 2) of the streamer 102. The four seismic sensors are depicted as 302A, 302B, 302C, and 302D. The arrangement of these four seismic sensors 302A-302D allows for better performance during rotation of the streamer 102 while being towed in the body of water.

In alternative implementations, other arrangements of seismic sensors can be used. For example, a group of three seismic sensors can be provided at each axial location along the longitudinal axis 210 of the streamer 102, or a group of more than four seismic sensors can be provided.

The measurement data collected by each pair (or group) of seismic sensors includes contributions from an upwardly-propagating seismic wave (reflected from the subterranean structure and depicted as 122 in FIG. 1) and from a downwardly-propagating seismic wave (due to reflection from the air-water interface and depicted as 124 in FIG. 1). The contribution from the upwardly-propagating seismic wave is the desired contribution, since it represents the subterranean structure. However, the contribution of the downwardly-propagating seismic wave results in a ghost signal in the measurement data, and is not desirable.

Generally, the pressure signal and vector signal in the measurement data collected by a pair of seismic sensors (e.g. 104A, 104B in FIG. 2) are in phase for the upwardly-propagating seismic wave. However, the pressure signal and the vector signal are out of phase in response to the downwardly-propagating seismic wave. In fact, the pressure signal and vector signal are out of phase by about 180 degrees.

In a specific example, the pressure signal and the vector signal can both have a positive peak value in response to an upwardly-propagating seismic wave (122 in FIG. 1). However, the pressure signal for the downwardly-propagating seismic wave (124 in FIG. 1) can have a negative peak value (due to reflection from the air-water interface 106), whereas the vector signal in response to the downwardly-propagating seismic wave can have a positive peak value. Thus, the pressure signal and the vector signal due to the downwardly-propagating seismic wave are out of phase with each other. If one of the pressure signal or vector signal is scaled, such as by application of a scaling factor, then combining (e.g., summing) the scaled version of the pressure signal or vector signal with the other of the pressure signal or vector signal will result in cancellation or attenuation of the downwardly-propagating seismic wave contribution in the measurement data. This results in deghosting of the measurement data collected by the pair of seismic sensors. The foregoing is valid if the vector signal is in the velocity domain. The vector signal obtained from the pair of sensors may have to be transformed to the velocity domain (e.g. integration from acceleration if the sensors measure acceleration) before scaling and adding as discussed above.

The scaling that can be performed can be based on application of a scaling factor equal to σ×C, where a represents the density of water, and C represents the velocity of sound in water. Generally, for a seismic wave propagating in an elastic medium, such as water, the amplitude of the pressure signal and the velocity of the particle motion associated with the seismic wave are proportional, and is defined by a ratio. This ratio is the acoustic impedance, represented by σ×C.

The scaling factor (σ×C) can be applied to the pressure signal, for example. The scaled pressure signal can then be combined (e.g. summed) with the vector signal to produce a combined output, as follows:

OUTPUT=Pressure Signal×Scaling_Factor1+Vector Signal, where Scaling_Factor1 corresponds to the acoustic impedance noted above.

In alternative examples, a scaling factor can be used to scale the vector signal, and the scaled vector signal can be combined with the pressure signal to produce a combined output, as follows:

OUTPUT=Pressure Signal+Vector Signal×Scaling_Factor2, where Scaling_Factor2 corresponds to the acoustic impedance noted above. Note that Scaling_Factor1 is different from Scaling_Factor2 (one is the inverse of the other).

Each of the foregoing combinations (e.g. summing) is referred to as a scaled combination (e.g. scaled summation).

Figure 4:
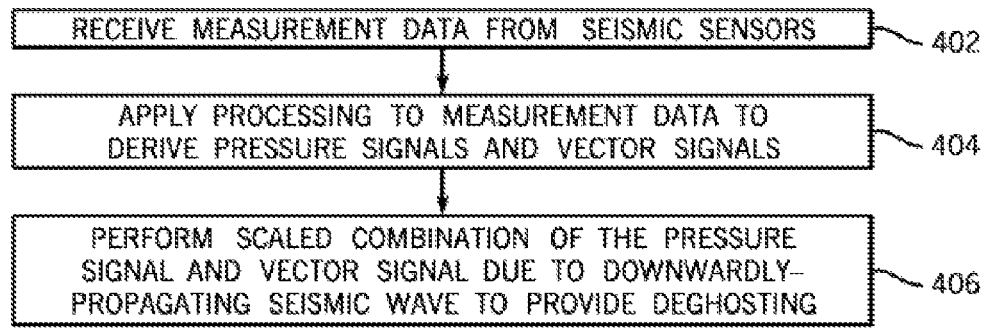
FIG. 4 is a flow diagram of a process of deghosting measurement data, according to some implementations.

FIG. 4 is a flow diagram of a process according to some implementations. Measurement data is received (at 402) from seismic sensors. The measurement data can be received from a pair of seismic sensors, or from multiple pairs of seismic sensors that are arranged at different axial positions of the streamer 102.

Processing can be applied (at 404) to the measurement data to derive pressure signals and vector signals, as discussed above. Next, the pressure signal and vector signal due to the downwardly-propagating seismic wave (124 in FIG. 1) are (at 406) subject to a scaled combination, which can result in deghosting. For example, the pressure signal and vector signal due to the downwardly-propagating seismic wave (124 in FIG. 1) are combined (e.g. summed) after one of the pressure signal and vector signal is scaled. This scaled combination results in elimination or attenuation of ghost signals due to the downwardly-propagating seismic wave (124) that is reflected from the air-water interface 106.

Figure 5:
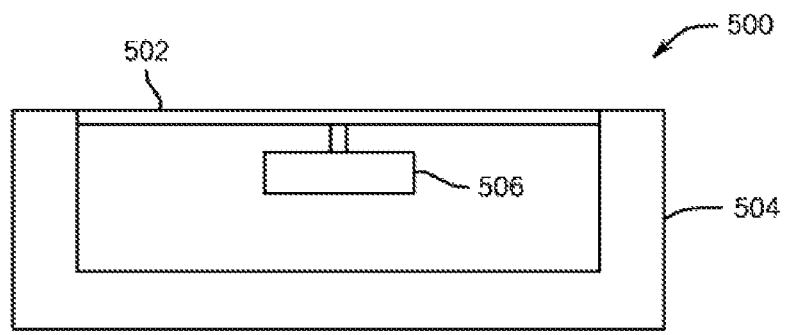
FIG. 5 is a schematic diagram of a seismic sensor according to alternative implementations.

FIG. 5 illustrates a seismic sensor 500 according to alternative implementations. The seismic sensor 500 includes a sensing element 502 that is attached to a housing 504 of the seismic sensor 500. The sensing element 502 can be a piezo element (e.g. piezo-ceramic element) or a MEMS membrane, as examples.

In addition, a mass 506 can be attached to the sensing element 502, to tune the sensitivity of the sensing element 502 to pressure and acceleration. Adding the mass 506 can increase the sensitivity of the sensing element 502 to acceleration. Without the mass 506, the sensor may be significantly more sensitive to pressure than acceleration, as for example in piezoelectric benders used in hydrophones. It will be then difficult to obtain a good measure of the acceleration when subtracting the signals from the sensor pair.

Figure 6:
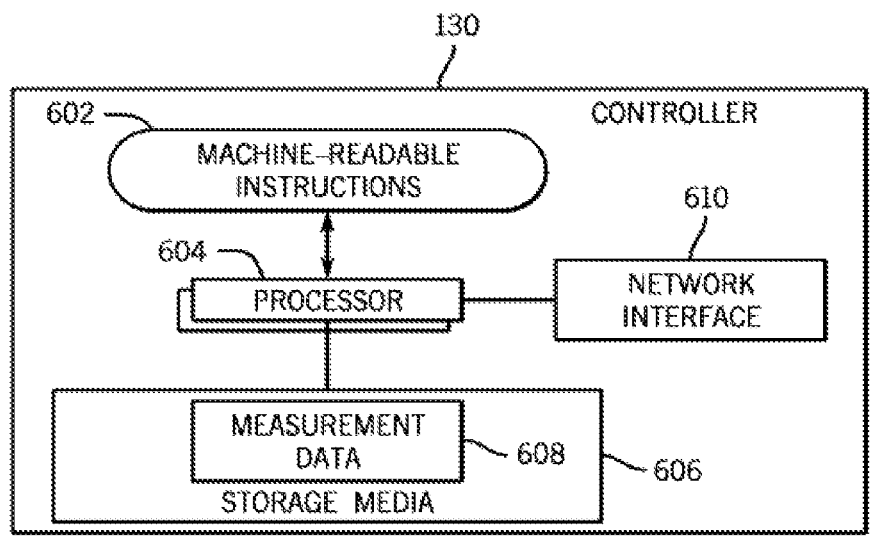
FIG. 6 is a block diagram of a controller according to some implementations.

FIG. 6 illustrates an example controller 130 according to some implementations. The controller 130 includes machine readable instructions 602 executable on one or multiple processors 604. The controller 130 can be implemented with a computer system, or with a distributed arrangement of computer systems. The processor(s) 604 is (are) connected to storage media 606, which can store measurement data collected by the sensors 104 depicted in FIG. 1. The controller 130 also includes a network interface 610 to allow the controller 130 to communicate with another system, such as with the streamer 102 to collect the measurement data, or to another system that communicates the measurement data to the controller 130.

A processor can include a microprocessor, microcontroller, processor module or subsystem, programmable integrated circuit, programmable gate array, or another control or computing device.

The storage media 606 is implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   seismic surveying with first, second, third and fourth seismic sensors on a streamer towed by a marine vessel, wherein the first and the second seismic sensors are pressure sensors, and the third and fourth seismic sensors are acceleration sensors;
   wherein the first and second seismic sensors each comprise a piezo element responsive to pressure and acceleration and a backside that faces radially inwardly from the piezo element toward a center of the streamer, wherein the backsides are spaced apart from one another by a distance;
   the third and fourth seismic sensors each have a piezo element responsive to acceleration and a backside that faces radially inwardly from the piezo element toward a center of the streamer in a direction different from one another;
   electrically connecting the first and second pressure sensors to one another to combine signals from the first seismic sensor and the second seismic sensor, the combining comprising;
   subtracting an acceleration signal of the first seismic sensor from an acceleration signal of the second seismic sensor to thereby substantially cancel out acceleration when the acceleration signals are combined so as to produce in aggregate a pressure signal.

2. The method of claim 1, wherein the piezo element of each of the first, second, third and fourth seismic sensors includes a single piezo-ceramic plate.

3. The method of claim 1, wherein the signals from the seismic sensors are responsive to a first seismic wave reflected from a subterranean structure, and a second seismic wave reflected from an air-water interface, the method further comprising using a result of the combining to perform deghosting for removing or attenuating a contribution of the second seismic wave to measurement data from the first and second seismic sensors.

4. The method of claim 3, further comprising:
   deriving a pressure signal and a vector signal from measurement data corresponding to the second seismic wave,
   wherein the pressure signal and vector signal are out of phase.

5. The method of claim 4, further comprising performing a scaled combination of the pressure signal and the vector signal to cause cancellation or attenuation of the contribution of the second seismic wave to the measurement data from the first and second seismic sensors.

6. The method of claim 5, wherein performing the scaled combination comprises applying a scaling factor to one of the pressure signal and the vector signal, and combining the scaled pressure signal or vector signal with the other of the pressure signal and vector signal.

7. The method of claim 6, wherein applying the scaling factor comprises applying a factor corresponding to an acoustic impedance.

8. An apparatus comprising:
a marine seismic streamer having first, second, third and fourth seismic sensors on the streamer, wherein the first and the second seismic sensors are pressure sensors, and the third and fourth seismic sensors are acceleration sensors, wherein the first and second seismic sensors each comprise a piezo element responsive to pressure and acceleration and a backside that faces radially inwardly from the piezo element toward a center of the streamer in a direction different from one another, wherein the backsides are spaced apart from one another by a distance;
the third and fourth seismic sensors each have a piezo element responsive to acceleration and a backside that faces radially inwardly from the piezo element toward a center of the streamer in a direction different from one another;
the first and second pressure sensors are electrically connected to one another so as to combine signals from the first seismic sensor and the second seismic sensor, the combining comprising;
subtracting an acceleration signal of the first seismic sensor from an acceleration signal of the second seismic sensor to thereby substantially cancel out acceleration when the signals signals are combined so as to produce in aggregate a pressure signal.

9. The apparatus of claim 8, wherein the third and fourth seismic sensors are electrically connected to one another to combine signals from the third seismic sensor and the fourth seismic sensor, the combining comprising: combining a signal of the third seismic sensor and a signal of the fourth seismic sensor to thereby substantially cancel out pressure when the signals are combined to produce in aggregate an acceleration signal.

10. The apparatus of claim 8, combining a signal of the third seismic sensor and a signal of the fourth seismic sensor to produce an average acceleration signal of the two that is output.

11. The apparatus of claim 8, further comprising:
a controller to:
receive measurement data from the seismic sensors;
reconstruct a pressure signal and a vector signal responsive to a given seismic wave; and
perform a scaled combination of the pressure signal and the vector signal to eliminate or attenuate deghosting signals in the measurement data.

12. The apparatus of claim 11, wherein the pressure signal is computed based on summing the measurement data from the seismic sensors.

13. The apparatus of claim 8, wherein at least one of the seismic sensors has a mass attached to the respective piezo element to tune the respective piezo element's sensitivity to acceleration.

* * * * *